(12) United States Patent
Moon

(10) Patent No.: US 11,092,097 B2
(45) Date of Patent: Aug. 17, 2021

(54) CONTROL METHOD FOR CVVD APPARATUS AT ENGINE STOP

(71) Applicants: Hyundai Motor Company, Seoul (KR); Kia Motors Corporation, Seoul (KR)

(72) Inventor: Chi Ho Moon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 109 days.

(21) Appl. No.: 16/531,841

(22) Filed: Aug. 5, 2019

(65) Prior Publication Data

US 2021/0040906 A1 Feb. 11, 2021

(30) Foreign Application Priority Data

Mar. 18, 2019 (KR) .................. 10-2019-0030654

(51) Int. Cl.
| | | |
|---|---|---|
| F02D 41/04 | (2006.01) | |
| F02N 11/08 | (2006.01) | |
| F02N 11/06 | (2006.01) | |
| F02D 41/06 | (2006.01) | |
| F02D 43/04 | (2006.01) | |
| F02D 13/02 | (2006.01) | |
| F02D 41/00 | (2006.01) | |

(52) U.S. Cl.
CPC ....... *F02D 41/042* (2013.01); *F02D 13/0215* (2013.01); *F02D 41/065* (2013.01); *F02D 43/04* (2013.01); *F02N 11/06* (2013.01); *F02N 11/0818* (2013.01); *B60W 2520/04* (2013.01); *F02D 2041/001* (2013.01)

(58) Field of Classification Search
CPC .. F02D 41/042; F02D 13/0215; F02D 41/065; F02D 43/04; F02D 2041/001; F02D 2200/101; F02N 11/0818; F02N 11/06; B60W 2520/04
See application file for complete search history.

(56) References Cited

U.S. PATENT DOCUMENTS

| | | | | |
|---|---|---|---|---|
| 5,103,780 A | * | 4/1992 | Ishii | ............ F01L 1/34406 123/90.15 |
| 5,280,770 A | * | 1/1994 | Satou | ............ F01L 1/267 123/90.15 |
| 6,278,933 B1 | * | 8/2001 | Buckland | ............ F02D 41/182 701/104 |

(Continued)

*Primary Examiner* — Joseph J Dallo
(74) *Attorney, Agent, or Firm* — Morgan, Lewis & Bockius LLP

(57) ABSTRACT

A control method for CVVD apparatus at engine stop, the control method may include receiving, by a controller, vehicle operation information from an information detection portion, determining, by the controller, whether it corresponds to a stop of an engine through the vehicle operation information, determining, by the controller, a predetermined target valve duration of a CVVD apparatus according to a stopping type of the engine in the stop of the engine, controlling, by the controller, the valve duration of the CVVD apparatus according to the predetermined target valve duration determined by the controller, determining, by the controller, if a current RPM of the engine is lower than a predetermined control stop RPM, and stopping the controlling of the valve duration of the CVVD apparatus if the current RPM is lower than the predetermined control stop RPM.

17 Claims, 5 Drawing Sheets

(56) References Cited

U.S. PATENT DOCUMENTS

| | | | |
|---|---|---|---|
| 6,378,484 B1* | 4/2002 | Russell | F02D 41/307 |
| | | | 123/295 |
| 6,915,769 B2* | 7/2005 | Yoshikawa | F02D 41/042 |
| | | | 123/90.17 |
| 6,945,224 B2* | 9/2005 | Yoshizawa | F02D 13/0226 |
| | | | 123/346 |
| 7,594,487 B2* | 9/2009 | Okamoto | F02D 13/0226 |
| | | | 123/90.16 |
| 8,131,448 B2 | 3/2012 | Fuwa | |
| 2002/0066436 A1* | 6/2002 | Majima | F02D 37/02 |
| | | | 123/406.47 |
| 2003/0121486 A1* | 7/2003 | Komazawa | F01L 1/3442 |
| | | | 123/90.17 |
| 2004/0031466 A1* | 2/2004 | Ogiso | F02D 41/0002 |
| | | | 123/348 |
| 2006/0213468 A1* | 9/2006 | Kawasaki | F02D 13/0238 |
| | | | 123/90.15 |
| 2009/0048764 A1* | 2/2009 | Fuwa | F01L 13/00 |
| | | | 701/105 |
| 2009/0157283 A1* | 6/2009 | Fuwa | F02D 41/083 |
| | | | 701/112 |
| 2018/0179972 A1* | 6/2018 | Nose | F02D 41/1456 |

* cited by examiner

CONTROL METHOD FOR CVVD APPARATUS AT ENGINE STOP

CROSS-REFERENCE TO RELATED APPLICATION

The present application claims priority to Korean Patent Application No. 10-2019-0030654 filed on Mar. 18, 2019, the entire contents of which is incorporated herein for all purposes by this reference.

BACKGROUND OF THE INVENTION

Field of the Invention

The present invention relates to a control method for CVVD apparatus at engine stop, and more particularly, to a control method for stopping an engine that realizes an efficient engine operation at the next engine start.

Description of Related Art

A valve control using CVVT (apparatus or system) or CVVL (apparatus or system) has been developed as an exhaust valve control system for improvement of performance, fuel consumption and emission through control of engine, and recently, a Continuous Variable Valve Duration (CVVD) has been developed and applied.

The CVVD system is a system that can independently control valve opening/closing timing and meet the fuel consumption and performance which was the trade-off relationship of the existing system simultaneously.

In other words, the CVVD system can independently control the valve opening/closing timing to set the optimum valve opening/closing timing.

However, the CVVD system has a large impact on fuel consumption, performance, and emission depending on how the target duration is set.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method for CVVD apparatus at engine stop which realizes efficient engine operation at the next engine start.

A control method for CVVD apparatus at engine stop, the control method according to an exemplary embodiment of the present invention may include receiving, by a controller, vehicle operation information from an information detector, determining, by the controller, whether it corresponds to a stop of an engine through the vehicle operation information, determining, by the controller, a predetermined target valve duration of a CVVD apparatus according to a stopping type of the engine in the stopping of the engine, controlling, by the controller, the valve duration of the CVVD apparatus according to the predetermined target valve duration determined by the controller, determining, by the controller, if a current RPM of the engine is lower than a predetermined control stop RPM, and stopping the controlling of the valve duration of the CVVD apparatus if the current RPM is lower than the predetermined control stop RPM.

The control method may further include determining, by the controller, whether the valve duration of the current CVVD apparatus has reached the predetermined target valve duration if the current RPM is not lower than the predetermined control stop RPM.

The control method may further include storing, by the controller, the current valve duration of the CVVD apparatus, in a response of determining that the current valve duration of the CVVD apparatus has reached the target valve duration.

The predetermined control stop RPM may be 100 rpm to 300.

The predetermined target valve duration may be a minimum valve duration to a maximum valve duration of 45% to 55%.

The stop of the engine may include an ignition key off, an engine stall stop and a stop by an idle stop.

The ignition key off may be determined by an output signal of an ignition key sensor.

The engine stall stop may be determined by an output signal of an RPM sensor.

The stop by the idle stop may be determined by output signals of an accelerator pedal sensor and a brake pedal sensor.

The vehicle operation information may include an ignition key sensor output signal, an RPM sensor output signal, an accelerator pedal sensor output signal, a brake pedal sensor output signal and an output signal of a valve duration sensor.

According to the control method for the CVVD apparatus at engine stop according to an exemplary embodiment of the present invention, efficient engine starting is possible at the next starting after engine stop.

According to the control method for the CVVD apparatus at engine stop according to an exemplary embodiment of the present invention, it is possible to improve the performance, fuel consumption and exhaust gas by determining the predetermined target valve duration according to the engine stop status.

Also, according to the control method for the CVVD apparatus at engine stop according to an exemplary embodiment of the present invention, even if the predetermined target valve duration is not reached, the valve duration control under the restricted condition may be stopped to prevent the breakage of the CVVD apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
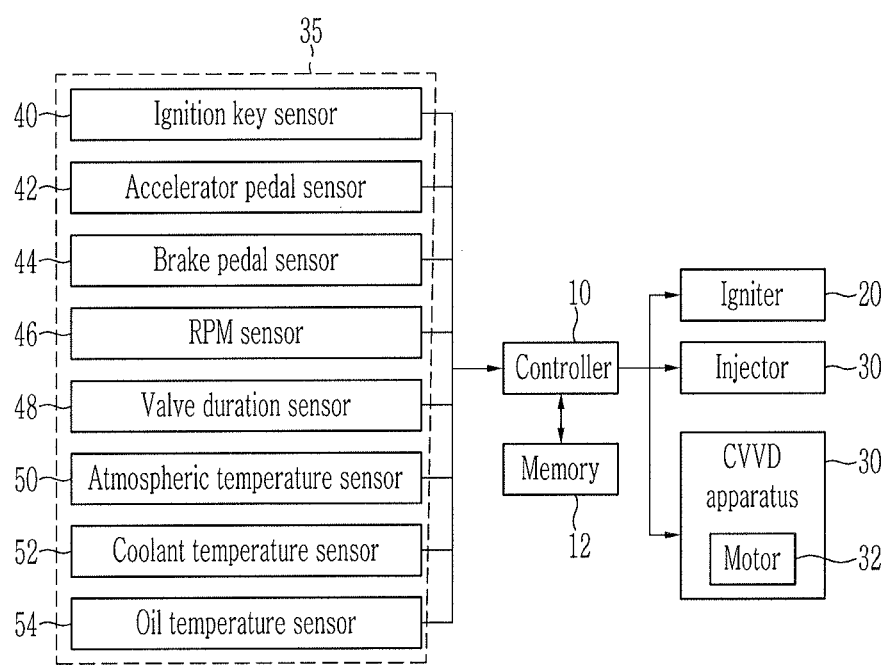
FIG. 1 is a block diagram of an engine system to which a continuous variable valve duration (CVVD) apparatus control method may be applied at engine stop according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents, and other embodiments, which may be included within the spirit and scope of the present invention as defined by the appended claims.

Hereinafter, an exemplary embodiment of the present invention will be described in detail with reference to accompanying drawings.

However, since the size and thickness of each constitution shown in the drawing are arbitrarily shown for convenience of explanation, the present invention is not necessarily limited to that shown in the drawing, and the thickness is enlarged to clearly express various parts and modes respectively.

To clearly illustrate the present invention, parts that are not related to the description are omitted. Throughout the specification, the same reference numeral is assigned to the same or similar constituent elements.

In the following description, the names of the components are denoted by first, second, and the like to distinguish them from each other because the names of the components are the same and are not necessarily limited to the order.

FIG. 1 is a block diagram of an engine system to which a CVVD apparatus control method may be applied at engine stop according to an exemplary embodiment of the present invention.

Referring to FIG. 1, an engine system of which a control method for CVVD apparatus at engine stop according to an exemplary embodiment of the present invention may be applied includes an information detector 35 for detecting current driving states of a vehicle and outputting the corresponding signals and a controller 10 for controlling operations of an igniter 20, an injector 22, and a continuous variable valve duration (CVVD) apparatus according to the output signals of the information detection portion 35.

The controller 10 may be implemented as at least one microprocessor operating according to a predetermined program, and the predetermined program may include a series of instructions for performing a method according to an exemplary embodiment of the present invention described below.

The information detection portion 35 includes an ignition key sensor 40 for detecting an operation of the ignition key and outputting a corresponding signal, an accelerator pedal sensor 42 for detecting an operation of an accelerator pedal and outputting a corresponding signal, a brake pedal sensor 44 for detecting an operation of a brake pedal and outputting a corresponding signal, an RPM sensor 46 for detecting an RPM of an engine and outputting a corresponding signal, a valve duration sensor 48 for detecting a duration of an intake valve and/or an exhaust valve and outputting an corresponding signal, an atmospheric temperature sensor 50 for detecting an atmospheric temperature and outputting a corresponding signal, a coolant temperature sensor 52 for detecting a coolant temperature and outputting a corresponding signal, and an oil temperature sensor 54 for detecting an oil temperature and outputting a corresponding signal.

The engine system may further include a memory 12 storing various maps for controlling the igniter 20, the injector 22, and the CVVD apparatus 30.

General construction and operation of the CVVD apparatus are obvious to those skilled in the art, and a detailed description thereof will be omitted.

In the case of an engine provided with the CVVD, the valve duration when the engine stops may be maintained at the valve duration at the next engine start.

Therefore, the valve duration setting at engine stop will affect the startability at the next engine start, so it is necessary to set the predetermined target valve duration at engine stop.

Figure 2:
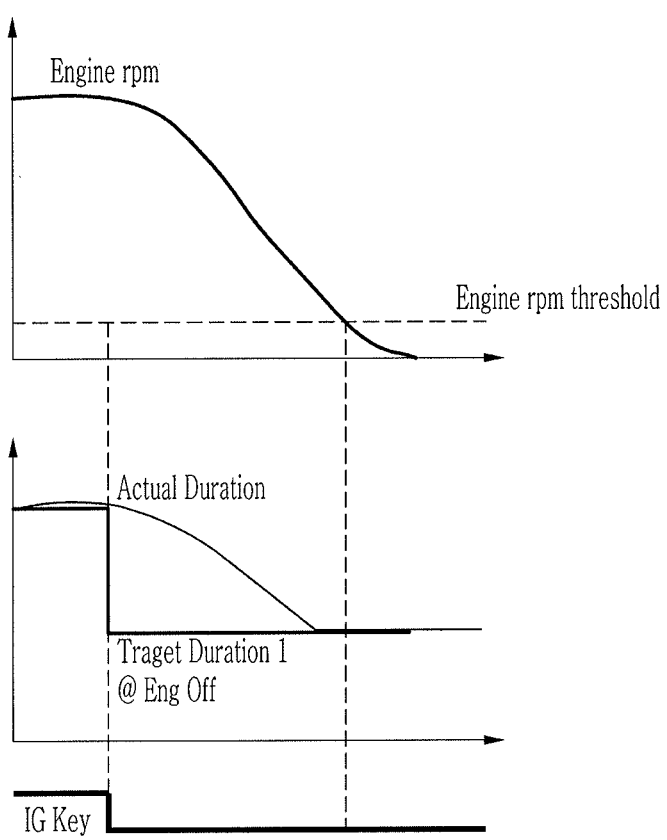
FIG. 2 and FIG. 3 are graphs showing valve durations according to the CVVD apparatus control method at engine stop according to an exemplary embodiment of the present invention.
Figure 3:
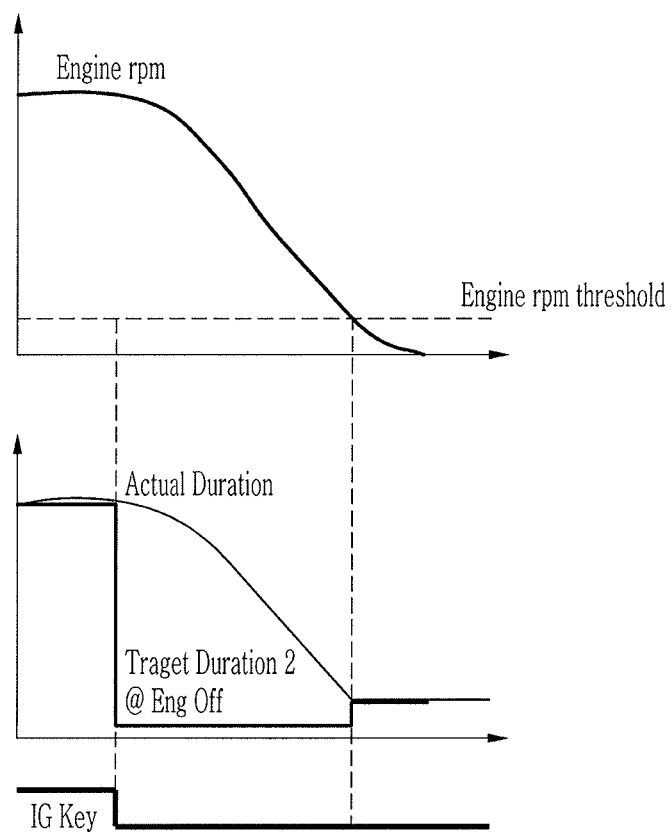

FIG. 2 and FIG. 3 are graphs showing valve durations according to the CVVD apparatus control method at engine stop according to an exemplary embodiment of the present invention.

Referring to FIG. 2, in the stop of the engine, for example, when an off signal of the ignition key sensor 40 occurs, the controller 10 controls the operation of the CVVD apparatus 30 by setting the target valve duration, and the predetermined target valve duration may be stored in the memory 12 as maps.

Also, the controller 10 controls the operation of the igniter 20 and the injector 22, and the operation control of the igniter 20 and the injector 22 in the engine stop state is obvious to a person skilled in the art, so a detailed description thereof will be omitted.

The controller 10 controls an operation of a motor 32 driving the CVVD apparatus 30 to cause the current valve duration to follow the predetermined target valve duration and stops control of the valve duration when the current valve duration reaches the target valve duration.

The controller 10 determines that the predetermined target valve duration has been reached if the detected valve duration is within a predetermined range based on the target valve duration.

The valve duration is detected by the valve duration sensor 48, for example, an encoder or a resolver that detects the rotation speed of the motor 32, a detecting sensor that detects a rotation of a motor shaft, a control shaft engaging the motor shaft etc., and the method/configuration for detecting the valve duration will be obvious to those skilled in the art, so a detailed description thereof will be omitted.

Referring to FIG. 3, an engine RPM may be lowered before the current valve duration reaches the target duration.

When the RPM of the engine is lowered, the CVVD apparatus may be damaged if the CVVD apparatus is driven.

If the present RPM is lower than a predetermined control stop RPM (engine RPM threshold), the controller 10 stops the valve duration control of the CVVD apparatus 30 to prevent hardware breakage.

At the present time, the controller 10 may stop the valve duration control by setting the valve duration at the moment of stopping the controlling of the valve duration of the CVVD apparatus 30 to the target valve duration.

The predetermined control stop RPM may be 100 rpm to 300 rpm.

In FIG. 2 and FIG. 3, the engine is stopped in a response to the ignition key sensor 40 being turned off. However, the present invention is not limited thereto, and the present invention may be similarly applied to various engine stop situations described later.

Figure 4:
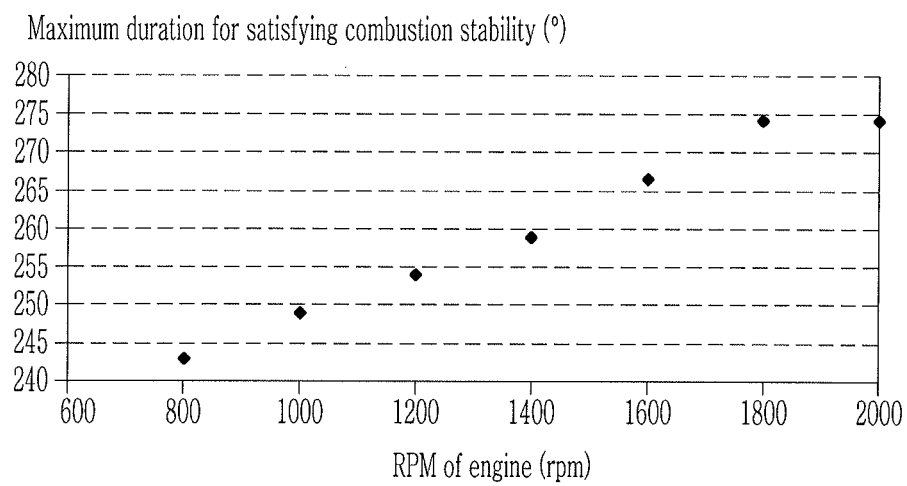
FIG. 4 is a graph showing engine stability according to engine RPM and valve duration.

FIG. 4 is a graph showing engine stability according to engine RPM and valve duration.

For efficient engine control, proper valve duration may be set, and valve duration setting is required to set the optimal value according to hardware design, engine stop situation and the like.

As shown in FIG. 4, the proper valve duration is investigated through an experiment to secure startability.

The CVVD apparatus applied to the experiment has a minimum valve duration of 140 degrees and a maximum valve duration of 280 degrees, but is not limited.

If the valve duration of the CVVD apparatus is set to a long duration, for example, when the valve duration is set to 275 degrees, an overlap between the intake valve and the exhaust valve occurs, reducing the intake air amount, reducing combustibility and deteriorating startability.

Conversely, if the valve duration of the CVVD apparatus is set to short duration at the time of starting, there is a risk of hardware damage when the engine is rotated at high RPM due to hardware characteristics.

An effect of startability and exhaust gas reduction was confirmed when the minimum valve duration versus the maximum valve duration was 45%-55%.

Figure 5:
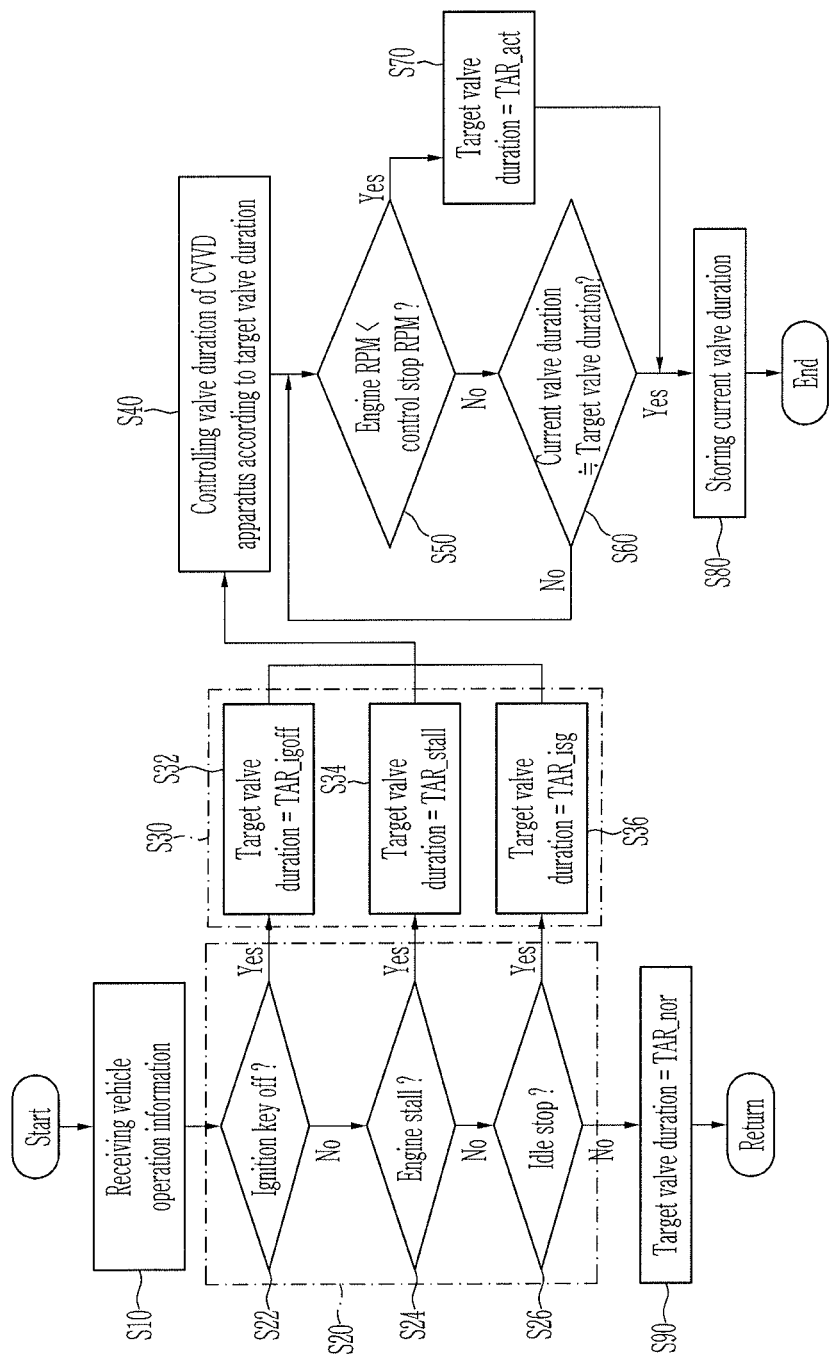
FIG. 5 is a flowchart which illustrating a CVVD apparatus control method at engine stop according to an exemplary embodiment of the present invention.

FIG. 5 is a flowchart which illustrating a CVVD apparatus control method at engine stop according to an exemplary embodiment of the present invention.

Referring to FIG. 1 to FIG. 5, a control method for CVVD apparatus at engine stop according to an exemplary embodiment of the present invention includes receiving, by the controller 10, a vehicle operation information from the information detection portion 35 (S10), determining, by the controller 10, whether it corresponds to a stop of an engine through the vehicle operation information (S20), determining, by the controller 10, a predetermined target valve duration of the CVVD apparatus 30 according to a stopping type of the engine in the stopping of the engine (S30), controlling, by the controller 10, the valve duration of the CVVD apparatus 30 according to the predetermined target valve duration determined by the controller 10 (S40), determining, by the controller 10, if a current RPM of the engine is lower than a predetermined control stop RPM (S50) and stopping the controlling of the valve duration of the CVVD apparatus 30 if the current RPM is lower than the predetermined control stop RPM (S70).

In the control method for CVVD apparatus at engine stop, the stopping the controlling of the valve duration of the CVVD apparatus is configured to stop a current valve duration TAR_act from following the predetermined target valve duration to stop the further control to prevent the CVVD apparatus 30 from being damaged.

The vehicle operation information may include the output signal of the ignition key sensor 40, the output signal of the RPM sensor 46, the output signal of the accelerator pedal sensor 42, and the output signal of the brake pedal sensor 44.

Furthermore, the vehicle operation information may further include various information for engine control such as the signals of the atmospheric temperature sensor 50, the coolant temperature sensor 52, the oil temperature sensor 54 and the like.

The control method may further include a step S60 in which the controller 10 determines whether the current valve duration of the CVVD apparatus 30 has reached the predetermined target valve duration if the current RPM is not lower than the predetermined control stop RPM.

The control method may further include a step S80 in which of the controller 10 stores the current valve duration of the CVVD apparatus 30.

The controller 10 may control the operation of the igniter 20 and the injector 22 based on the stored valve duration at the next engine start.

The predetermined control stop RPM may be 100 rpm to 300 rpm.

As described above, when the engine RPM is lowered, the CVVD apparatus may be damaged if the CVVD apparatus is driven.

Therefore, in the exemplary embodiment of the present invention, it is possible to prevent the breakage of the CVVD apparatus by setting the predetermined control stop RPM at 100 rpm to 300 rpm when the engine is stopped.

The predetermined target valve duration may be between 45% and 55% of the minimum valve duration versus the maximum valve duration, which is the minimum valve duration to the maximum valve duration of 45% to 55%.

That is, as described above, the predetermined target valve duration is set to 45%-55% of the minimum valve duration versus the maximum valve duration in consideration of startability and emission reduction.

After starting the engine, stopping the engine may be caused by several factors.

That is, there is a stop by the ignition key off, a stop by the engine stall, a stop by the idle stop in the case of the vehicle provided with an idle stop and go system.

It is necessary to set appropriate valve duration according to stop situation.

In the control method according to the exemplary embodiment of the present invention, the engine stop includes an ignition key off stop S22.

The ignition key off state may be determined through the output signal of the ignition key sensor 40.

When the ignition key is turned off, a long-term vehicle stoppage may occur according to the intention of the driver, and valve duration setting is required for securing the startability at the next starting and reducing the emission at the starting time.

At the present time, the controller 10 is configured to set the ignition target valve duration (TAR_igff) as the target valve duration, that is, CVVD target value at the time of turning off the ignition key (S32).

The ignition target valve duration (TAR_igff) at the ignition key off time is determined by considering the startability at the next starting time and the emission reduction at the starting time, which may be determined by the experiment and stored in the memory 12.

In the control method according to the exemplary embodiment of the present invention, the engine stop includes a stop by an engine stall (S24).

The stall stop of the engine may be determined, for example, via the output signal of the RPM sensor 46. The determination of whether or not the engine stall is obvious to those skilled in the art will be omitted in detail.

The stop by the engine stall is an unintended engine stop situation and requires a duration setting that allows the engine to enter the most stable state.

In the instant case, the controller 10 is configured to set an engine stall target valve duration (TAR_stall) as the predetermined target valve duration of the CVVD at S34.

Here, the engine stall target valve duration (TAR_stall) is determined considering the entry of the engine into the most stable state, which may be determined by the experiment and stored in the memory 12.

In the control method according to the exemplary embodiment of the present invention, the engine stop includes a stop by an idle stop S26.

The stop by the idle stop may be determined through the output signals of the accelerator pedal sensor 42 and the brake pedal sensor 44. Whether the idle stop is stopped or not is known to those skilled in the art, so a detailed description thereof will be omitted.

The Stopping by idle stops is crucial to ensure immediate restartability with engine stop for enhancement of fuel consumption.

In the instant case, the controller 10 is configured to set the idle stop target valve duration (TAR_isg) to the target valve duration, that is, the CVVD target value (S36).

Here, the idle stop target valve duration (TAR_isg) is determined by accounting for instantaneous restartability, which may be determined by the experiment and stored in the memory 12.

The output signals of the atmospheric temperature sensor 50, the coolant temperature sensor 52, and the oil temperature sensor 54 may be stored in the memory 12 to further determine the CVVD target value.

In the non-stop situation, the controller 10 controls the CVVD apparatus 30 with a general target valve duration (TAR_nor) according to the signal of the information detection portion 35 and also controls the operation of the igniter 20 and injector 22 (S90).

According to the exemplary embodiments of the present invention, it is possible to improve performance and fuel consumption by determining the predetermined target valve duration for each engine stop situation.

Further, when the engine is stopped, even if the predetermined target valve duration is not reached, the valve duration control under the restricted condition may be stopped to prevent the breakage of the CVVD apparatus.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a continuous variable valve duration (CVVD) apparatus at engine stop, the method comprising:
   receiving, by a controller, vehicle operation information from an information detector;
   determining, by the controller, when the vehicle operation information corresponds to a stop of an engine;
   determining, by the controller, a predetermined target valve duration of the CVVD apparatus according to the stop of the engine, in a response of determining that the vehicle operation information corresponds to the stop of the engine;
   controlling, by the controller, a valve duration of the CVVD apparatus according to the predetermined target valve duration determined by the controller;
   determining, by the controller, when a current revolutions per minute (RPM) of the engine is lower than a predetermined control stop RPM; and
   stopping the controlling of the valve duration of the CVVD apparatus upon determining that the current RPM is lower than the predetermined control stop RPM,
   wherein the predetermined target valve duration is a minimum valve duration to a maximum valve duration of 45% to 55%.

2. The method of claim 1, further including:
   determining, by the controller, when a current valve duration of the CVVD apparatus has reached the predetermined target valve duration upon determining that the current RPM is not lower than the predetermined control stop RPM.

3. The method of claim 2, further including:
   storing, by the controller, the current valve duration of the CVVD apparatus, in a response of determining that the current valve duration of the CVVD apparatus has reached the target valve duration.

4. The method of claim 1, wherein the predetermined control stop RPM is 100 rpm to 300.

5. The method of claim 1, wherein the stop of the engine includes an ignition key off, an engine stall stop or a stop by an idle stop.

6. The method of claim 5, wherein the controller is configured to set an ignition target valve duration as the predetermined target valve duration in the ignition key off.

7. The method of claim 5, wherein the controller is configured to set an engine stall target valve duration as the predetermined target valve duration of the CVVD in the engine stall stop.

8. The method of claim 5, wherein the controller is configured to set an idle stop target valve duration as the predetermined target valve duration in the stop by the idle stop.

9. The method of claim 5,
   wherein the information detector includes an ignition key sensor; and
   wherein the ignition key off is determined according to an output signal of the ignition key sensor.

10. The method of claim 5,
    wherein the information detector includes an RPM sensor; and
    wherein the engine stall stop is determined according to an output signal of the RPM sensor.

11. The method of claim 5,
    wherein the information detector includes an accelerator pedal sensor and a brake pedal sensor; and wherein the stop by the idle stop is determined according to output signals of the accelerator pedal sensor and the brake pedal sensor.

12. The method of claim 1,
wherein the information detector includes an ignition key sensor, an RPM sensor, an accelerator pedal sensor, a brake pedal sensor, and a valve duration sensor, and
wherein the vehicle operation information includes output signals of the ignition key sensor, the RPM sensor, the accelerator pedal sensor, the brake pedal sensor, and the valve duration sensor.

13. A system of controlling a continuous variable valve duration (CVVD) apparatus at engine stop, the system comprising:
an information detector; and
a controller connected to the information detector and configured of:
receiving vehicle operation information from the information detector;
determining when the vehicle operation information corresponds to a stop of an engine;
determining a predetermined target valve duration of the CVVD apparatus according to the stop of the engine, in a response of determining that the vehicle operation information corresponds to the stop of the engine;
controlling a valve duration of the CVVD apparatus according to the predetermined target valve duration determined by the controller;
determining when a current revolutions per minute (RPM) of the engine is lower than a predetermined control stop RPM; and
stopping the controlling of the valve duration of the CVVD apparatus upon determining that the current RPM is lower than the predetermined control stop RPM,
wherein the predetermined target valve duration is a minimum valve duration to a maximum valve duration of 45% to 55%.

14. The system of claim 13, wherein the controller is further configured of:
determining when a current valve duration of the CVVD apparatus has reached the predetermined target valve duration upon determining that the current RPM is not lower than the predetermined control stop RPM.

15. The system of claim 14, wherein the controller is further configured of:
storing the current valve duration of the CVVD apparatus, in a response of determining that the current valve duration of the CVVD apparatus has reached the predetermined target valve duration.

16. The system of claim 14,
wherein the information detector includes an ignition key sensor, an RPM sensor, an accelerator pedal sensor, and a brake pedal sensor,
wherein the stop of the engine includes an ignition key off, an engine stall stop or a stop by an idle stop,
wherein the ignition key off is determined according to an output signal of the ignition key sensor,
wherein the engine stall stop is determined according to an output signal of the RPM sensor, and
wherein the stop by the idle stop is determined according to output signals of the accelerator pedal sensor and the brake pedal sensor.

17. The system of claim 16,
wherein the controller is configured to set an ignition target valve duration as the predetermined target valve duration in the ignition key off,
wherein the controller is configured to set an engine stall target valve duration as the predetermined target valve duration of the CVVD in the engine stall stop, and
wherein the controller is configured to set an idle stop target valve duration as the predetermined target valve duration in the stop by the idle stop.

* * * * *